(12) United States Patent
Kim et al.

(10) Patent No.: US 6,289,007 B1
(45) Date of Patent: Sep. 11, 2001

(54) METHOD FOR ACQUIRING A CELL SITE STATION IN ASYNCHRONOUS CDMA CELLULAR COMMUNICATION SYSTEMS

(75) Inventors: Dong In Kim; Yu Ro Lee; Yeon Soo Kim; Heung Ryel You, all of Seoul (KR)

(73) Assignee: Korea Telecom, Seoul (KR)

( * ) Notice: Subject to any disclaimer, the term of this patent is extended or adjusted under 35 U.S.C. 154(b) by 0 days.

(21) Appl. No.: 09/136,423

(22) Filed: Aug. 20, 1998

(30) Foreign Application Priority Data

Feb. 5, 1998 (KR) .................................................. 98-3304

(51) Int. Cl.[7] ................................................. H04B 7/216
(52) U.S. Cl. ........................... 370/331; 370/335; 370/342
(58) Field of Search ..................................... 370/328, 329, 370/331, 335, 342, 441, 514, 515; 455/436, 437, 438, 446, 449

(56) References Cited

U.S. PATENT DOCUMENTS

| | | | |
|---|---|---|---|
| 5,673,260 | * 9/1997 | Umeda et al. ........................ | 370/342 |
| 5,680,395 | * 10/1997 | Weaver, Jr. et al. .................. | 370/331 |
| 5,825,835 | * 10/1998 | Kingston et al. ..................... | 370/367 |
| 6,144,650 | * 11/2000 | Watanabe et al. .................... | 370/335 |
| 6,157,631 | * 12/2000 | Rohani ................................. | 370/342 |

* cited by examiner

Primary Examiner—Ricky Ngo
(74) Attorney, Agent, or Firm—Staas & Halsey LLP

(57) ABSTRACT

A group code and a cell code are multiplexed and then used as a pilot code for discriminating a base station in asynchronous cellular CDMA (Code Division Multiple Access) communication systems. Using the multiplexed code, interferences are reduced in case of using two pilot codes. A method for acquiring a cell site station in asynchronous CDMA (Code Division Multiple Access) communication systems including a base station controller, a plurality of mobile stations and base stations, and discriminating the base stations by using different sequences, the method including the steps of: a) assigning a group code of the cell as a pilot code of an inphase channel of the base stations; b) assigning a cell code of the cell as a pilot code of a quadrature channel of the base stations; and c) multiplexing the pilot codes of inphase channel and the quadrature channel, and generating an inphase/quadrature pilot code.

12 Claims, 7 Drawing Sheets

METHOD FOR ACQUIRING A CELL SITE STATION IN ASYNCHRONOUS CDMA CELLULAR COMMUNICATION SYSTEMS

BACKGROUND OF THE INVENTION

1. Technical Field of the Invention

The present invention relates to a method for acquiring a cell site station in CDMA (Code Division Multiple Access) communication systems, and more particularly, to a method for allowing a mobile station to access a base station of a cell in asynchronous CDMA cellular communication systems by using a pilot channel multiplexing two separate code sequences.

2. Description of the Prior Art

In general CDMA cellular communication systems, there are a plurality of base stations, and a pilot code of a pilot channel is used for acquiring a base station in a cell. A short code or a long code is used as the pilot code.

The long code is used as the pilot code in the conventional communication system such as an IS-95 (Interim Standard) or W-CDMA (Wideband CDMA) communication system. In the conventional system, each of the base stations uses an identical code for pilot channels and obtains timing information from GPS (Global Positioning System) equipment to synchronize transmission time of the pilot channel. In this case, since the expensive equipment, GPS, is required in each base station, the cost of the communication system can be quite high. Also, where the base station is set up in an underground space, the use of the GPS equipment has many technical difficulties.

In the conventional CDMA communication system, each of the base stations, that is, each pilot code of the base stations is discriminated by the time offset of the same PN (Pseudo Noise) sequence. For example, each base station of the IS-95 system, which has the PN sequence length 32768 and the chip rate 1.2288 Mcps, is identified with the time offset by a 64-chips, and each base station of the W-CDMA system, which has the PN sequence length 81920 and the chip rate 4.096 Mcps, is identified with the time offset by a 256-chips. Therefore, 512 base stations may be identified in the IS-95 system, and 320 base stations may be identified in the W-CDMA system.

As for each base station to use time offsets different from each other, all the base stations must have the exact timing information between them. In particular, if the inaccuracy of the timing information is larger than the time offset, it is not possible to identify each of the base stations. Therefore, in the IS-95 and W-CDMA systems, an exact synchronization between the base stations is obtained by the GPS. A communication system based on the GPS has many problems.

Since the mobile station has the reference code of the pilot code, of which the phase offset is 0, the mobile station may synchronize its phase with the phase of the base station which is denied to access, by obtaining the pilot code.

However, in an asynchronous CDMA system, because the mobile station can not obtain an accurate phase offset, the mobile station should search the phase offset for a full period of the codes. Therefore, it takes a long time for a mobile station to obtain synchronization.

Also, because the phase offset between the base stations is not constant, a difference between contiguous base stations can not be obtained. Therefore, when the handover is performed from the base station communicating with the mobile station to a new base station, there is a drawback that the mobile station should search a phase offset of a pilot code used in the new base station.

In the conventional CDMA system using short codes, each base station uses two different codes as the pilot codes. That is, to effectively use the pilot codes, pilot codes are divided to several subgroups, and a representative code representing its subgroup is added to each of the subgroups. The subgroup consists of the representative code and the constitution codes. The subgroup is used as a cluster pilot, the representative code of the subgroup as the cluster pilot code, and the constitution code as the cell pilot code, respectively. The base station provides a cluster pilot channel transferring the cluster code and a separate cell pilot channel transferring the cell code.

In other words, some cells may form one cluster. All cells associated with the same cluster use the same pilot channel, and each cell in the cluster is identified by a cell pilot code. When the mobile station sets up a call, the mobile station accesses the cluster pilot channel before it accesses the cell pilot channel.

In the above system using short codes, it takes a lot of time to access the base station, because the mobile station has no information of the base station. First, the mobile station should obtain synchronization of the cluster pilot channel. Then the mobile station receives the information of the cell codes corresponding cluster from the cluster synchronization channel. The mobile station obtains synchronization with the cell pilot channel using the received cell codes, thereby acquiring the base station.

In this case, since the mobile station accesses the cell pilot codes after searching the cluster pilot codes, the number of sequences the mobile station searches may be fairly decreased.

For example, we assume that there are 512 base stations and 512 pilot codes are divided to 16 cluster pilot codes, each of which has 32 cell pilot codes. Accordingly, the mobile station searches for 16 codes, finds its own cluster, and searches for 32 cell pilot codes. As a result, the mobile station searches for only 48 codes instead of 512 codes. This method may be used for the asynchronous CDMA systems as well as the synchronous CDMA system.

However, there still remain other problems in the method using two pilot channels for acquiring the base station. One of them is an increment of interferences between two pilot channels in the acquisition of an initial synchronization.

SUMMARY OF THE INVENTION

Therefore, an object of the present invention is to provide a method which allows a mobile station to quickly access a base station with decreasing interference between pilot channels in an asynchronous cellular CDMA communication system.

According to the first aspect of the present invention, this object is accomplished by providing a method for acquiring a cell site station in an asynchronous CDMA (Code Division Multiple Access) communication system comprising a base station controller, a plurality of mobile stations and base stations, and discriminating the base stations by using different sequences, the method including the steps of: a) assigning a group code of the cell as a pilot code of an inphase channel of the base station; b) assigning a cell code of the cell as a pilot code of a quadrature channel of the base station; and c) multiplexing the pilot codes of the inphase channel and the quadrature channel, and generating a inphase/quadrature pilot code.

According to the second aspect of the present invention, this object is accomplished by providing a method for acquiring a cell site station in an asynchronous CDMA (Code Division Multiple Access) communication system with a hierarchical cell structure, wherein the system includes a base station controller, a plurality of mobile stations and base stations, wherein the hierarchical cell structure comprises a plurality of macro cells and micro cells, wherein each base station uses a different sequence, the method including the steps of: a) assigning a group code of each macro cell as a pilot code of an inphase channel of the base station in the macro cell, wherein the mobile station discriminates a group of the base station in the macro cell using the group code; b) assigning a cell code of each the macro cell as a pilot code of a quadrature channel of the base station in said macro cell; c) assigning a group code of each said micro cell as a pilot code of an inphase channel of the base station in the micro cell, wherein the group code of the micro cell is the same as the cell code of the macro cell; and d) assigning a cell code of each said micro cell as a pilot code of a quadrature channel of the macro cell, wherein the cell code of the micro cell is generated in accordance with the group code of the macro cell.

According to the third aspect of the present invention, this object is accomplished by providing a method for acquiring a cell site station in an asynchronous CDMA (Code Division Multiple Access) communication system with a hierarchical cell structure during a handoff which transfers communications between a mobile station and an old base station in a macro cell to communications between a mobile station and a new base station in a micro cell, wherein each base station uses a different sequence, the method including the steps of: a) searching for synchronization of a group code which is a pilot code of the inphase channel in the micro cell; b) searching for a cell code which is a pilot code of the quadrature channel in the micro cell; and c) searching for frame synchronization.

According to the fourth of the present invention, this object is accomplished by providing a method for acquiring a cell site station in an asynchronous CDMA (Code Division Multiple Access) communication system with a hierarchical cell structure during a handoff which transfers communications between a mobile station and an old base station in a micro cell to communications between a mobile station and a new base station in a macro cell, wherein each base station uses a different sequence, the method including the steps of: a) searching for synchronization of a group code which is a pilot code of the inphase channel in the macro cell; b) searching for a cell code which is a pilot code of the quadrature channel in the macro cell; and c) searching for frame synchronization.

BRIEF DESCRIPTION OF THE DRAWINGS

Other objects and aspects of the invention will become apparent from the following description of the embodiments with reference to the accompanying drawings in which.

DETAILED DESCRIPTION OF THE PREFERRED EMBODIMENTS

The preferred embodiments of the present invention will be described with reference to the accompanying drawings.

Figure 1:
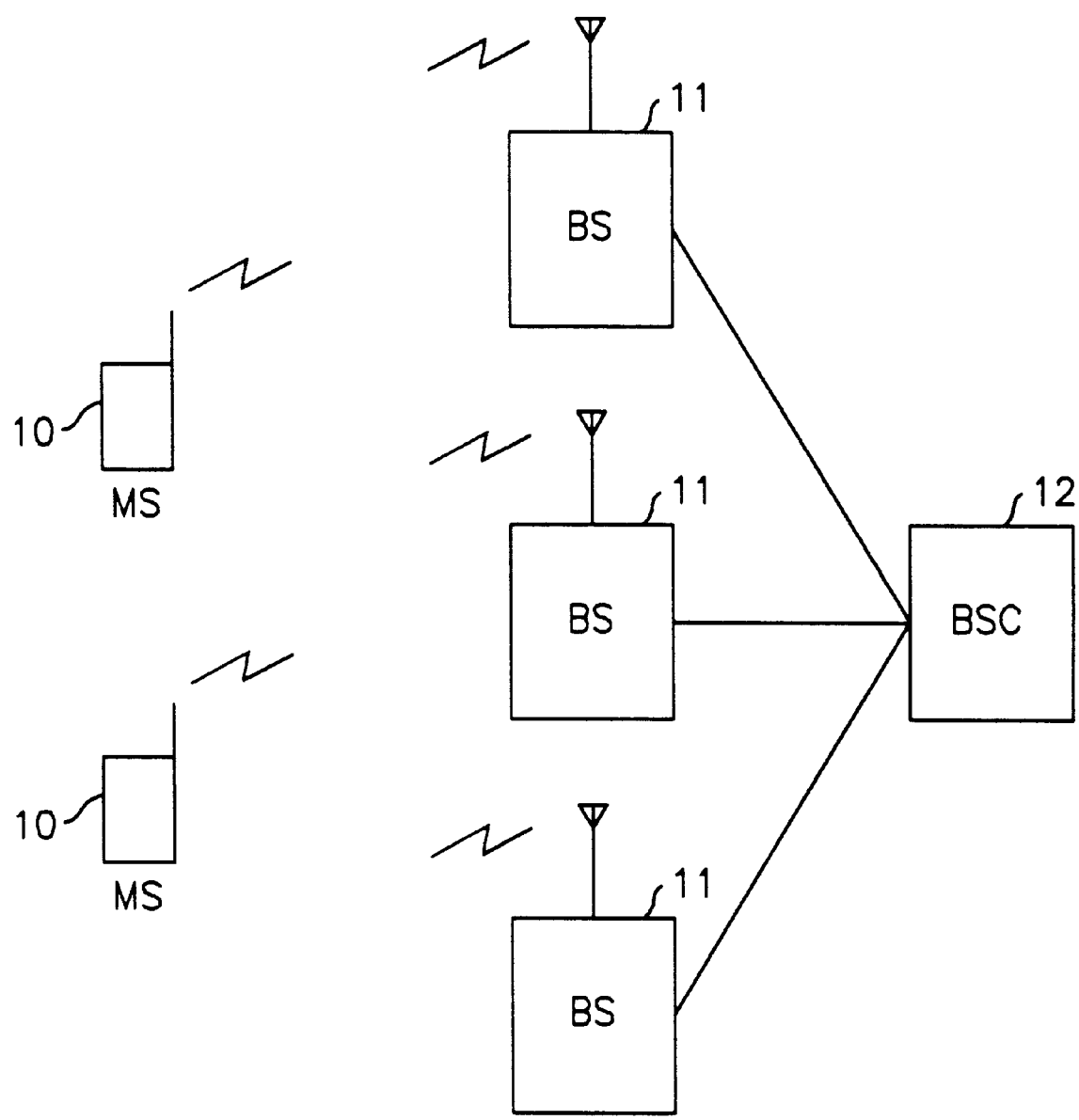
FIG. 1 is a schematic view illustrating CDMA communication system applied to the present invention.

Referring to FIG. 1, the CDMA system applied to the present invention includes a plurality of mobile stations 10, a plurality of base stations 11 and a base station controller 12.

The mobile station 10, which is a portable terminal, sends and receives various calls. The base station 11, which is connected to the base station controller 12 via wired channels, provides the mobile station 10 with various radio channels including pilot channels and traffic channels. The pilot channel provides pilot codes and a timing reference. The pilot codes are used to form a channel between the mobile station 10 and the base station 11. The timing reference is required for the mobile station to use the other channels of the base station. Because each base station has peculiar pilot code, the base station may be discriminated by the pilot code. The base station controller 12 controls the operation of the base stations 11.

Figure 2:
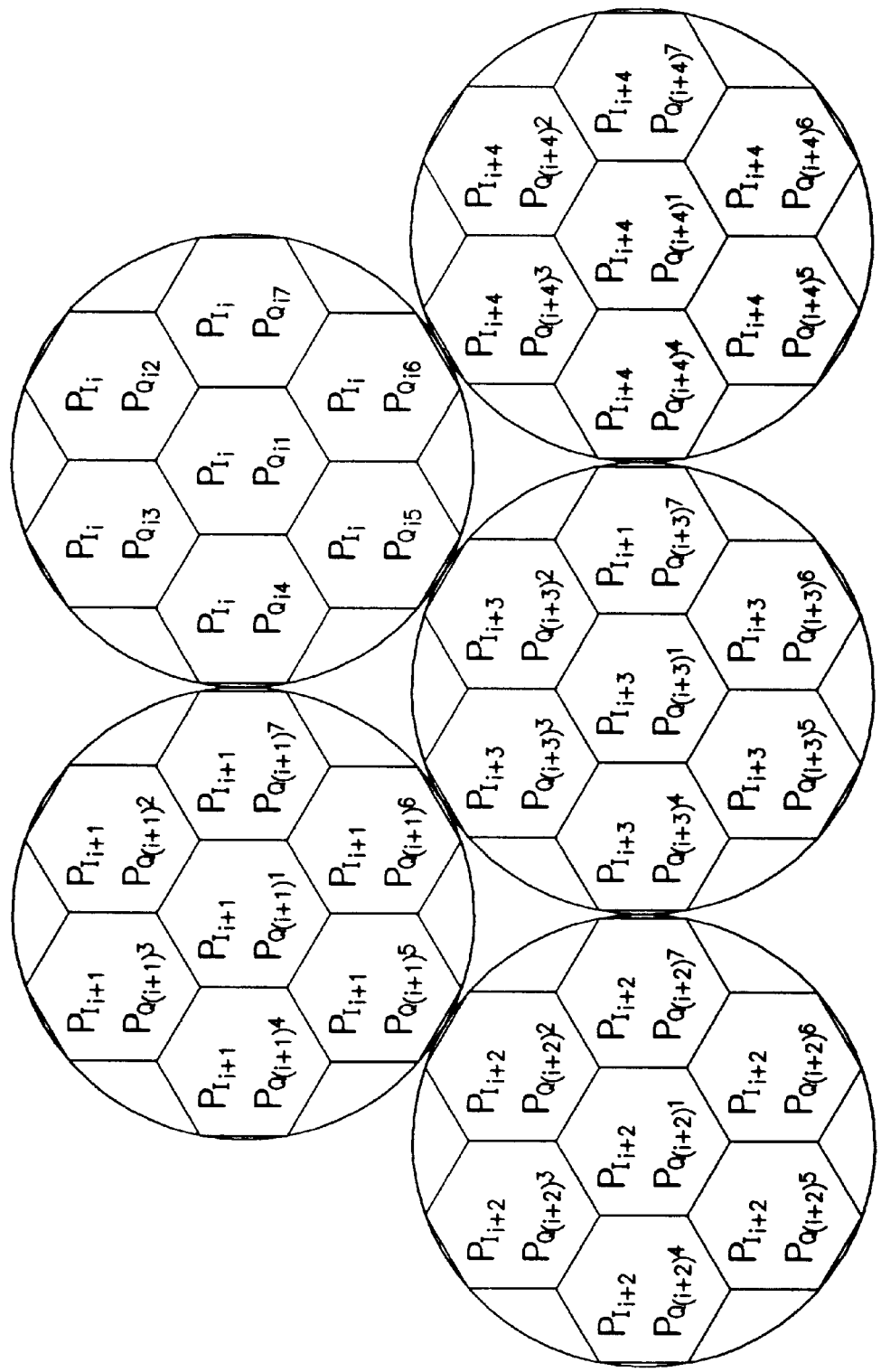
FIG. 2 is a schematic view illustrating a cell structure of the asynchronous CDMA system in accordance with the present invention.

Referring to FIG. 2, a radio zone is divided into some groups, each of which includes some cells. Each group has pilot codes, and the pilot codes in the group have an identical phase. Hereinafter, a group code refers to a code for discriminating group, and a cell code refers to a code for discriminating a cell in the group. In this case, since it is not necessary for the mobile station to search for all the base stations in order to find the base station communicating with the mobile station, a fast acquisition of synchronization can be obtained by reduction of cell search time.

Figure 3:
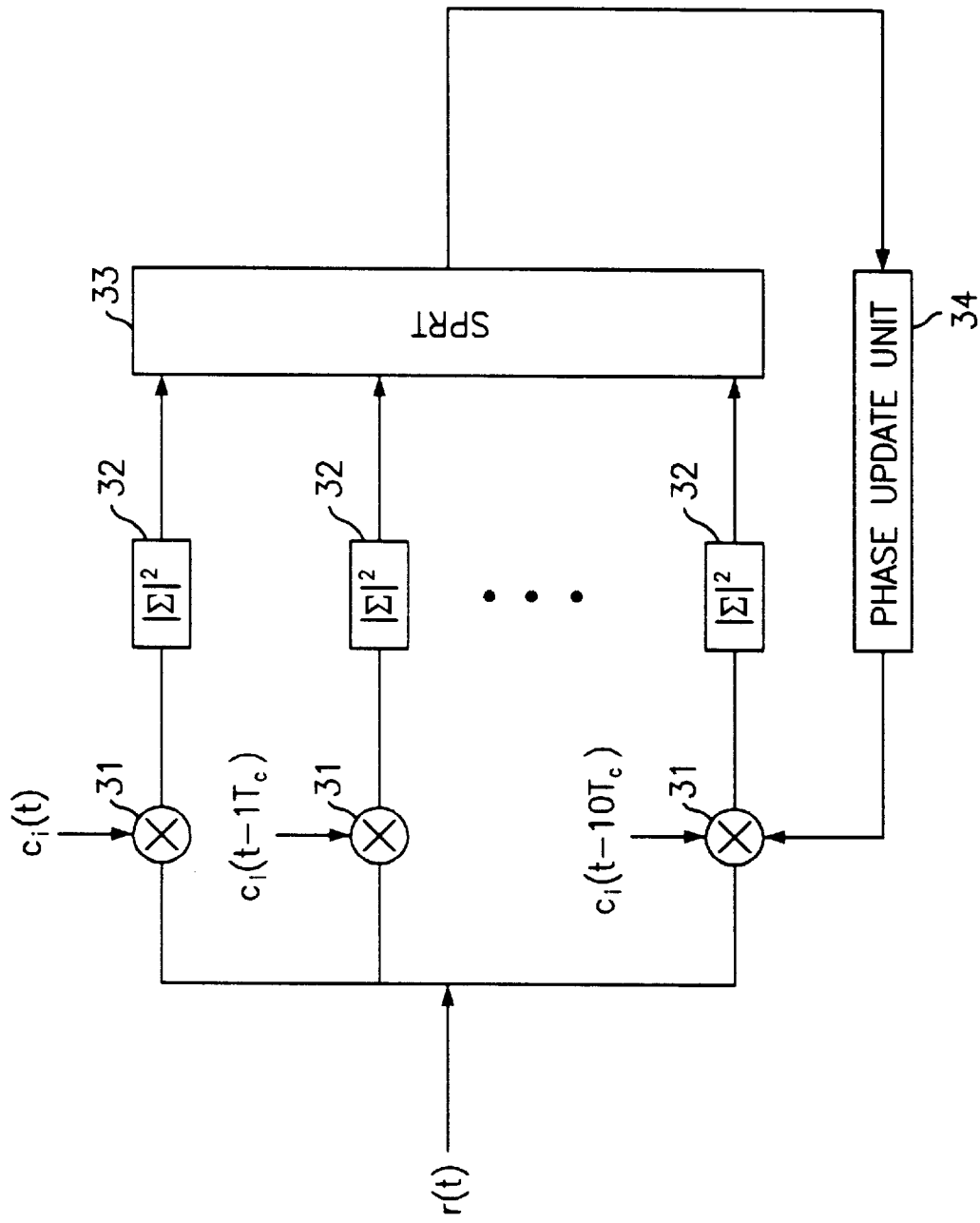
FIG. 3 is a block diagram illustrating a sequential probability ratio testing apparatus used for an acquisition of synchronization in the receiver in accordance with the present invention.

Referring to FIG. 3, a receiver includes a plurality of correlators 31, a plurality of square-means detectors 32, a sequential probability ratio testing circuit (SPRT) 33 and a phase update circuit 34 in accordance with the present invention.

The received signal r(t) is despread by the correlator 31 which multiplies the received signal by the inphase or the quadrature correlation code c(t). A plurality of the correlators 31 may search in parallel the same number of the codes 31, thereby reducing the cell search time.

In the prior art, since the received signal is used only in either inphase or quadrature channel, the SIR (signal to noise ratio) of the received signal is lower than that of the signal in both inphase and quadrature channels. It is necessary for the number of the chip correlated to be increased in order to increase the SIR of correlation result of the signal in the inphase channel to the value which is equal to the SIR of correlation result of the signal in both the inphase and the quadrature signals. Therefore, it takes more time to match chips and the complexity of the communication system becomes larger.

To solve this problem, in the present invention, the receiver delays the signal in the quadrature channel by a specific number of chips, simultaneously multiplies the pilot codes of the inphase channel and the pilot codes of the quadrature channel by the correlation codes and adds the multiplied signals, instead of performing the summation of the multiplied signals after respectively multiplying the signal in inphase/quadrature channel by the inphase channel pilot code and quadrature channel pilot code. Here, the specific number of the chips is equal to the number of chips which are correlated at a time.

The square-means detector 32 receives the despread signal and outputs the square-means value of the despread signal. The SPRT adds the received signals from the square-means detectors 32 and generates a first output value. The SPRT 33 compares the first output value with a threshold having a specific range and determines whether the signal acquires synchronization in accordance with the comparison result.

When the first output value is larger than the threshold, it is determined that an acquisition of synchronization is performed. When the output value is in the range of the threshold, the SPRT adds newly received signals through the correlators 31 and square-means detectors 32 and generates a second output value. Then the SPRT 33 compares the summation result of the second output value and the first output vale with the threshold, and determines whether the signal acquires synchronization. When the output value is smaller than the threshold, acquisition of synchronization fails to be performed. The received signal is shifted by the specific number of chips by the phase shift circuit 34. Then, the SPRT adds the shifted signals through the correlators 31 and square-means detectors 32, compares and determines again.

Now, methods for acquiring synchronization in single cell and hierarchical cell structure according to the present invention will be described in detail.

Figure 4:
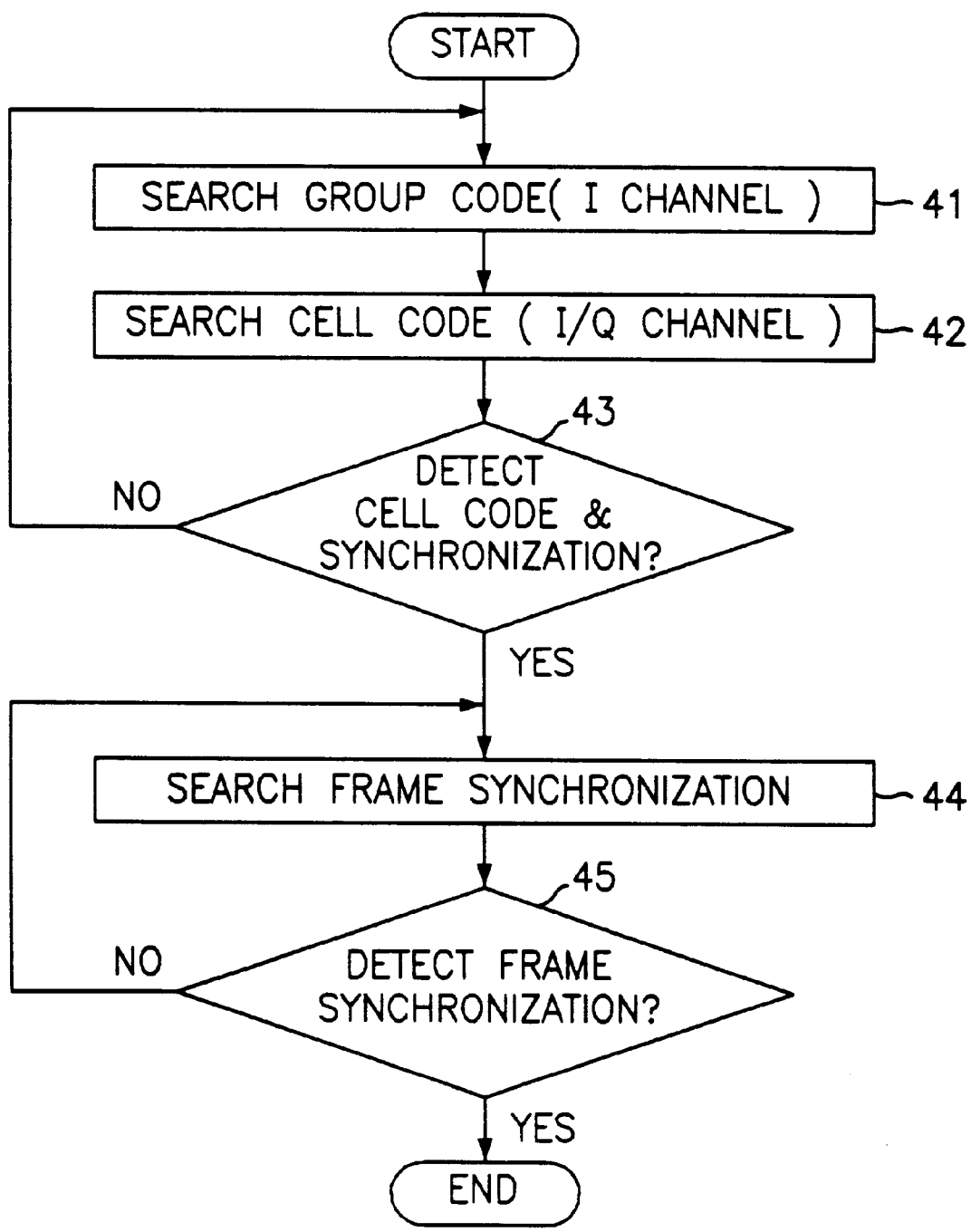
FIG. 4 is a flowchart illustrating a fast cell access in the case of using an identical frequency in accordance with the present invention.

Referring to FIG. 4, a synchronization acquisition method in a single cell will be described in detail. FIG. 4 shows a flowchart illustrating a fast cell access method where the mobile station accesses a cell in cells using an identical pilot sequence in accordance with the present invention.

The group code is assigned to the inphase pilot channel, and the cell code is assigned to the quadrature pilot channel. The inphase channel signal and the quadrature channel signal are multiplexed.

First, to access a cell, the mobile station searches for the inphase pilot channels, and finds its group code and synchronization of the group code at step 41. Then the mobile station searches the quadrature pilot channels by using the sequential probability ratio testing method, finds its cell code and acquires synchronization of the cell code at step 42. The mobile station determines whether its cell code and synchronization of the cell code are detected at step 43. That is, the mobile station generates correlation codes, which are cell codes, as many as the number of correlators 31 in FIG. 3, by using the synchronization of the group code. The received signals through the correlators 31 and the square-means detectors 32 are compared with the threshold and determined.

If the detection is performed at step 43, that is, the output value from the square-means detector 32 is larger than the threshold, the mobile station finds synchronization of the frame at step 44. Here, the phase of the frame is equal to that of one of the pilot codes in the frame. Therefore, using the synchronization of the group code and the receiver as shown in FIG. 3, the frame synchronization can be obtained without complexity of the system.

Then the mobile station determines whether the synchronization of the frame is detected at step 45. If the frame synchronization is detected, the process for searching ends.

At step 43, if the detection is not performed, the process goes back to step 41 and restarts searching as above mentioned.

At step 45, if the synchronization of the frame is not detected, the process goes back to step 44 and searches again the frame synchronization.

Figure 5:
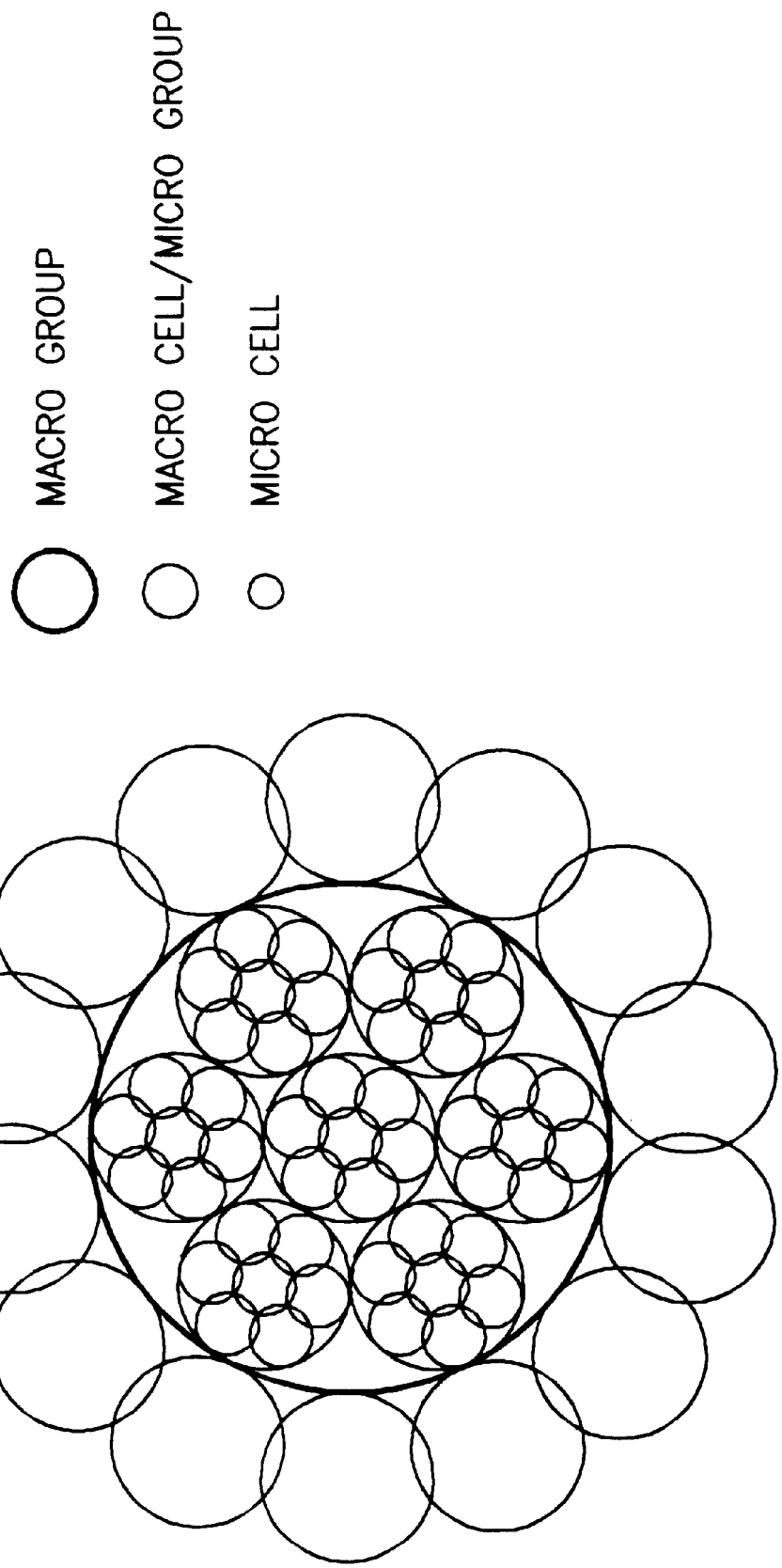
FIG. 5 is a schematic view illustrating a hierarchical cell structure comprising macro cells and micro cells.
Figure 6:
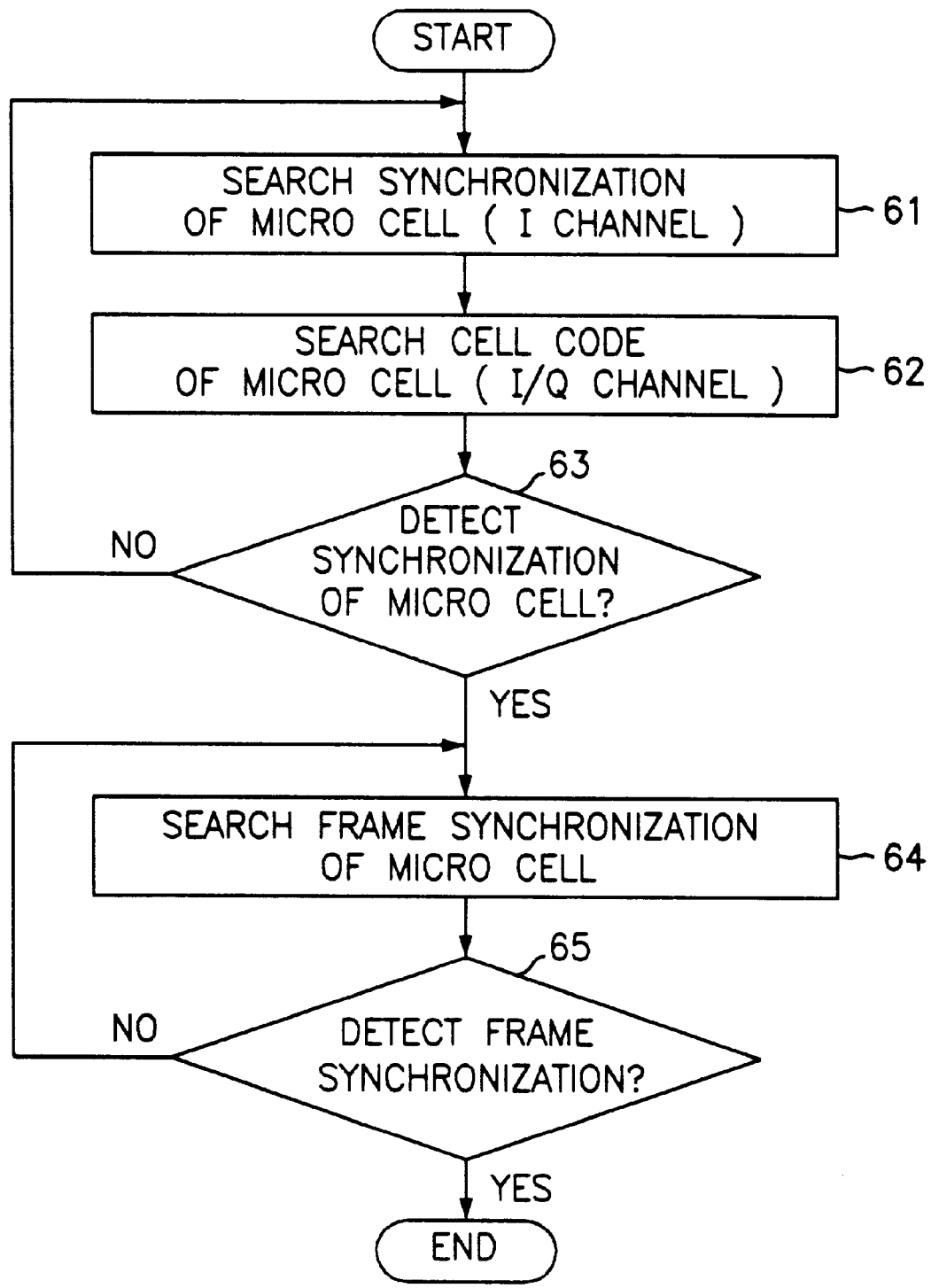
FIG. 6 is a flowchart illustrating a macro cell access and a handoff from a macro cell to a micro cell in a hierarchical cell structure in accordance with the present invention.
Figure 7:
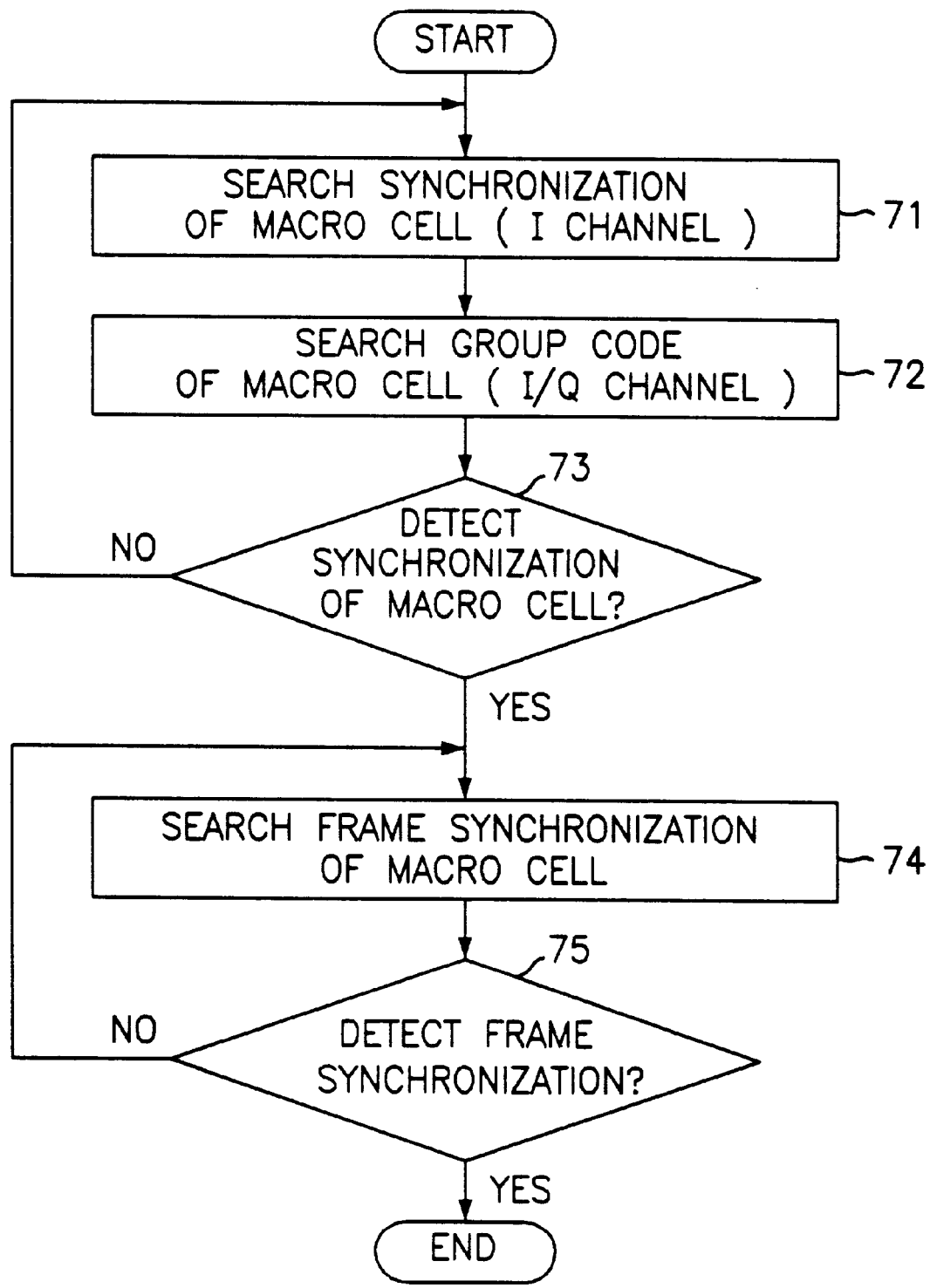
FIG. 7 is a flowchart illustrating a micro cell access and a handoff from a micro cell to a macro cell in a hierarchical cell structure in accordance with the present invention.

Referring to FIGS. 5 through 7, synchronization acquisition methods in hierarchical cell structure will be described in detail.

First, a hierarchical cell structure will be described.

FIG. 5 is a schematic view illustrating a hierarchical cell structure in accordance with the present invention.

In the hierarchical cell structure, a macro cell and micro cell exist together. The macro cell having a large radius is suitable for a user moving at high speed and used for the current cellular system. The micro cell having a small radius is suitable for a user moving at low speed and used for the personal communication system.

A macro cell comprises a plurality of micro cells. In other words, some micro cells may be conglomerated as a group which is referred to as a macro cell. Frequency for the macro cell is different from that for the micro cell. The pilot code of the quadrature channel of the macro cell, which is the cell code of the macro cell, is assigned to the pilot code of the inphase channel of the micro cell which is the group code of the micro cell. An output code from a sequence generator which generates group codes of the macro cell using primitive polynomials is assigned to the pilot code of the quadrature channel of the micro cell. Using this method, it is possible for the mobile station to quickly access the base station in either a macro cell or micro cell.

When the handoff is performed from one old base station communicating with the mobile station to a new base station, it is possible for the mobile station to access the new base station by using the I/Q channel pilot code of the old base station. When the handoff is performed from the macro cell to the micro cell, the group code of the micro cell is used. On the contrary, when the handoff is performed from the micro cell to the macro cell, the cell code is used.

FIG. 6 is a flowchart illustrating a macro cell access and a handoff from a macro cell to a micro cell in a hierarchical cell structure in accordance with the present invention.

The mobile station communicates with the base station after performing cell access as described with reference to FIG. 4. As the mobile station moves, it is necessary for the mobile station to communicate with another base station. That is, it is necessary to perform the handoff.

When the handoff is performed from the base station in the macro cell to a base station in a micro cell, first the mobile station searches the synchronization of the pilot code of the inphase channel in the micro cell at step 63. Then the mobile station searches the cell code of the micro cell at step 64, and determines whether the synchronization of the micro cell is detected at step 65. If the synchronization is detected, the mobile station searches the frame synchronization of the micro cell at step 66. The mobile station determines whether the frame synchronization is detected at step 67. If the frame synchronization is detected, the process ends.

At step 65, if the detection is not performed, the process goes back to step 63 and restarts searching as above mentioned.

At step 67, if the frame synchronization is not detected, the process goes back to step 66 and searches again the frame synchronization of the micro cell.

FIG. 7 is a flowchart illustrating a micro cell access and a handoff from a micro cell to a macro cell in a hierarchical cell structure in accordance with the present invention.

When the handoff is performed from the base station in the micro cell to a base station in a macro cell, first the mobile station searches the synchronization of the pilot code of the inphase channel in the macro cell at step 71. Here, the pilot code of the inphase channel is the group code of the macro cell. Then the mobile station searches the cell code of the macro cell at step 72, and determines whether the synchronization of the macro cell is detected at step 73. If the synchronization is detected, the mobile station searches the frame synchronization of the macro cell at step 74. The mobile station determines whether the frame synchronization is detected at step 75. If the frame synchronization is detected, the process ends.

At step 73, if the detection is not performed, the process goes back to step 71 and restarts searching as above mentioned.

At step 75, if the frame synchronization is not detected, the process goes back to step 74 and searches again the frame synchronization of the micro cell.

Though, in the above described embodiments, the group code is assigned to the inphase pilot channel, and the cell code is assigned to the quadrature pilot channel, those skilled in the art appreciate that the group code may be assigned to the quadrature pilot channel, and the cell code may be assigned to the inphase pilot channel.

In the present invention as above mentioned, I/Q multiplexed code assignment has the characteristics of assigning different code channel information to the inphase channel and the quadrature channel separately.

In this case, the present invention can effectively utilize the I/Q multiplexed channel compared to the two-pilot scheme because the latter assigns the same code channel to the inphase and the duplicate quadrature channels simultaneously.

This feature is very similar to the case of double-sideband transmission which can be simplified into single-sideband transmission by using only one sideband information and eliminating the duplicate other sideband. Here, the I/Q code scheme assigns other code channel information to the quadrature channel.

Therefore, in cellular CDMA environments, the above I/Q code multiplexing provides an enhanced SIR because of reduced code channels, causing less interferences and in turn reduced cell search time by assigning code channels separately and then searching these channels sequentially.

Although the preferred embodiments of the invention have been disclosed for illustrative purposes, those skilled in the art will appreciate that various modifications, additions and substitutions are possible without departing from the scope and spirit of the invention as disclosed in the accompanying claims.

What is claimed is:

1. A method for acquiring a cell site station in an asynchronous CDMA (Code Division Multiple Access) communication system comprising a base station controller, a plurality of mobile stations and base stations, and discriminating the base stations by using different sequences, the method comprising:
   a) assigning a group code of the cell as a pilot code of an inphase channel of the base station;
   b) assigning a cell code of the cell as a pilot code of a quadrature channel of the base station; and
   c) multiplexing the pilot codes of the inphase channel and the quadrature channel, and generating an inphase/quadrature pilot code.

2. A method as claimed in claim 1, further comprising:
   d) synchronizing, at the mobile station, with the group code of the base station by searching the inphase channel of the inphase/quadrature pilot code;
   e) synchronizing, at the mobile station, with the cell code of the base station by searching the quadrature channel of the inphase/quadrature pilot code; and
   f) synchronizing, at the mobile station, with a frame by searching code offsets of the frame.

3. A method as claimed in claim 2, wherein said step c) comprises:
   performing correlation of a plurality of the inphase pilot codes in parallel; and
   performing correlation of a plurality of the quadrature pilot codes after delaying the inphase/quadrature pilot codes by a number of chips correlated at the same time.

4. A method for acquiring a cell site station in an asynchronous CDMA (Code Division Multiple Access) communication system comprising a base station controller, a plurality of mobile stations and base stations, and discriminating the base stations by using different sequences, the method comprising:
   a) assigning a group code of the cell as a pilot code of a quadrature channel of the base station;
   b) assigning a cell code of the cell as a pilot code of an inphase channel of the base station; and
   c) multiplexing the pilot codes of the inphase channel and the quadrature channel, and generating an inphase/quadrature pilot code.

5. A method as claimed in claim 4, further comprising:
   d) synchronizing, at the mobile station, with the group code of the base station by searching the quadrature channel of the inphase/quadrature pilot code
   e) synchronizing, at the mobile station, with the cell code of the base station by searching the inphase channel of the inphase/quadrature pilot code; and
   f) synchronizing, at the mobile station, with a frame by searching code offsets of the frame.

6. A method as claimed in claim 5, wherein said step c) comprises:
   performing correlation of a plurality of the quadrature pilot codes in parallel; and
   performing correlation of a plurality of the inphase pilot codes after delaying the inphase/quadrature pilot codes by a number of chips correlated at the same time.

7. A method for acquiring a cell site station in an asynchronous CDMA (Code Division Multiple Access) communication system with a hierarchical cell structure, wherein the system includes a base station controller, a plurality of mobile stations and base stations, wherein the hierarchical cell structure comprises a plurality of macro cells and micro cells, wherein each base station uses a different sequence, the method comprising:
   a) assigning a group code of each macro cell as a pilot code of an inphase channel of the base station in the macro cell, wherein the mobile station discriminates a group of the base station in the macro cell using the group code;
   b) assigning a cell code of each macro cell as a pilot code of a quadrature channel of the base station in said macro cell;
   c) assigning a group code of each micro cell as a pilot code of an inphase channel of the base station in the micro cell, wherein the group code of the micro cell is the same as the cell code of the macro cell; and
   d) assigning a cell code of each said micro cell as a pilot code of a quadrature channel of the micro cell, wherein the cell code of the micro cell is generated in accordance with the group code of the macro cell.

8. A method for acquiring a cell site station in an asynchronous CDMA (Code Division Multiple Access) communication system with a hierarchical cell structure, wherein the system includes a base station controller, a plurality of mobile stations and base stations, wherein the hierarchical cell structure comprises a plurality of macro cells and micro cells, wherein each base station uses a different sequence, the method comprising:

a) assigning a group code of each macro cell as a pilot code of a quadrature channel of the base station in the macro cell, wherein the mobile station discriminates a group of the base station in the macro cell using the group code;

b) assigning a cell code of each macro cell as a pilot code of an inphase channel of the base station in said macro cell;

c) assigning a group code of each micro cell as a pilot code of a quadrature channel of the base station in the micro cell, wherein the group code of the micro cell is the same as the cell code of the macro cell; and d) assigning a cell code of each micro cell as a pilot code of an inphase channel of the macro cell, wherein the cell code of the micro cell is generated in accordance with the group code of the macro cell.

9. A method for acquiring a cell site station in an asynchronous CDMA (Code Division Multiple Access) communication system with a hierarchical cell structure during a handoff which transfers communications between the mobile station and an old base station in a macro cell to communications between a mobile station and a new base station in a micro cell, wherein each base station uses a different sequence, the method comprising:

a) searching for synchronization of a group code which is a pilot code of an inphase channel in the micro cell;

b) searching for a cell code which is a pilot code of a quadrature channel in the micro cell; and c) searching for frame synchronization.

10. A method for acquiring a cell site station in an asynchronous CDMA (Code Division Multiple Access) communication system with a hierarchical cell structure during a handoff which transfers communications between a mobile station and an old base station in a macro cell to communications between the mobile station and a new base station in a micro cell, wherein each base station uses a different sequence, the method comprising:

a) searching for synchronization of a group code which is a pilot code of a quadrature channel in the micro cell;

b) searching for a cell code which is a pilot code of an inphase channel in the micro cell; and c) searching for frame synchronization.

11. A method for acquiring a cell site station in an asynchronous CDMA (Code Division Multiple Access) communication system with a hierarchical cell structure during a handoff which transfers communications between the mobile station and an old base station in a micro cell to communications between a mobile station and a new base station in a macro cell, wherein each base station uses a different sequence, the method comprising:

a) searching for synchronization of a group code which is a pilot code of an inphase channel in the macro cell;

b) searching for a cell code which is a pilot code of a quadrature channel in the macro cell; and c) searching for frame synchronization.

12. A method for acquiring a cell site station in an asynchronous CDMA (Code Division Multiple Access) communication system with a hierarchical cell structure during a handoff which transfers communications between the mobile station and an old base station in a micro cell to communications between a mobile station and a new base station in a macro cell, wherein each base station uses a different sequence, the method comprising:

a) searching for synchronization of a group code which is a pilot code of a quadrature channel in the macro cell;

b) searching for a cell code which is a pilot code of an inphase channel in the macro cell; and c) searching for frame synchronization.

* * * * *